United States Patent [19]

Bengtsson

[11] 4,185,207

[45] Jan. 22, 1980

[54] AMPLIFIER SYSTEM WITH ALTERNATE INPUTS

[75] Inventor: Nils Å. Bengtsson, Bjarred, Sweden

[73] Assignee: AB Svensk Nivakontroll, Malmo, Sweden

[21] Appl. No.: 824,831

[22] Filed: Aug. 15, 1977

[51] Int. Cl.$^2$ ............................................ H01H 35/18
[52] U.S. Cl. ................................... 307/118; 361/178; 340/622; 340/625
[58] Field of Search ............... 307/362, 308, 118, 116, 307/310; 73/305, 314, 317, 304 R, 295; 340/618, 622, 625; 361/170, 178; 328/1, 3, 4

[56] References Cited

U.S. PATENT DOCUMENTS

| | | | |
|---|---|---|---|
| 3,558,909 | 1/1971 | Janson | 307/116 |
| 3,750,036 | 7/1973 | Burrows et al. | 307/362 |
| 3,849,674 | 11/1974 | Nettles | 307/362 |
| 4,068,138 | 1/1978 | Miyakawa et al. | 307/362 |

FOREIGN PATENT DOCUMENTS 1485100  1/1970  Fed. Rep. of Germany ........... 307/116

Primary Examiner—L. T. Hix
Assistant Examiner—James L. Dwyer
Attorney, Agent, or Firm—Alfred E. Miller

[57] ABSTRACT

An amplifier system includes an operational amplifier having a reference applied to one input terminal. A voltage above or below the reference voltage is applied to the other input terminal by way of an interface circuit. The interface circuit adapts the input for use with a switch or, alternatively, the interface may be disabled to permit use of a variable resistor input such as a thermistor. The output of the operational amplifier may be a switching circuit. The amplifier system is adapted for use in a fluid level system to permit the alternate use of a switch type or thermistor level sensor.

16 Claims, 2 Drawing Figures

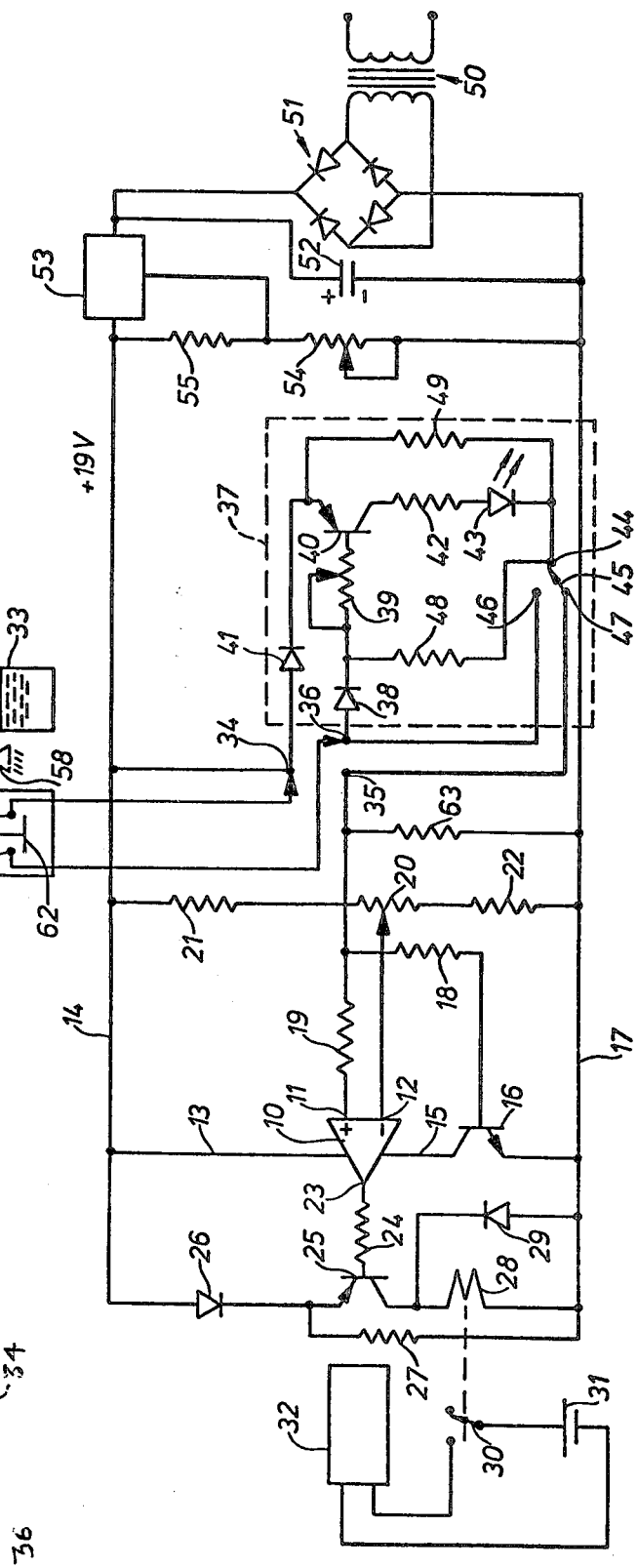
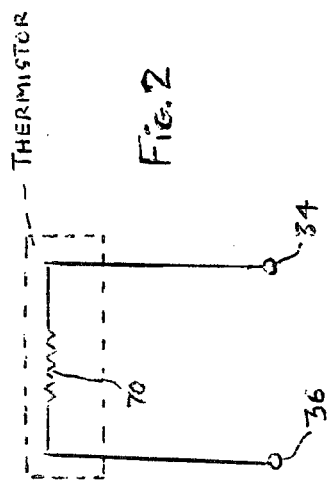
Fig. 1
Fig. 2

AMPLIFIER SYSTEM WITH ALTERNATE INPUTS

BACKGROUND OF THE INVENTION

This invention relates to an amplifier having first and second input terminals and an output terminal, the first input terminal being connected to a fluid level sensor applying to the terminal at least two distinctive different levels of electrical potential, the second input terminal being connected to a reference potential and the output terminal being connected to a switch device. One of the distinctive levels, having greater magnitude than the reference potential, operates the switch device to take a first position and the other of the distinctive levels, having lower magnitude than the reference potential, operates the switch device to take a second position. The first and second positions correspond to connecting and disconnecting of a load to a power supply.

A known amplifier of the kind disclosed above is intended to cooperate with sensors of the thermistor type, particularly those having a positive temperature coefficient. For example, such a PTC-thermistor at temperatures between 20° C. and about 150° C. has a resistance of about 100 ohms, whereas the thermistor at higher temperatures has a resistance of the order of several kiloohms. The change of resistance occurs very abruptly at the resistance switching temperature, in the example 160° C. The sensor is positioned in a fluid container or tank to indicate during filling of the tank when the fluid has reached a predetermined level. An electric current of suitable magnitude flows through the thermistor to increase the temperature of the thermistor, when surrounded by air, above the resistance switching temperature. The thermistor then assumes its high resistance condition. The predetermined fluid level is indicated when the thermistor has changed its resistance into the low resistance condition. This is caused by the cooling action of the fluid when surrounding the thermistor.

It is desirable that the amplifier disclosed above can alternatively be used together with sensors of the switch type, i.e. sensors that have a connection between two terminals that is either open or closed. Further, it is desirable that the amplifier when adapted to switch type sensors cannot be responsive to a thermistor sensor to operate the switch device to its second position in order to connect the load to the power supply.

It is an object of the invention to meet the requirements indicated above. To achieve this object, the invention is characterized by the features stated in the appending claims.

Briefly stated, in accordance with the invention, the above objects are achieved by providing an operational amplifier having a reference voltage connected to one input. When an input sensor is in the form of a switch, the switch is connected to the other input terminal of the amplifier by way of an interface responsive to the open or closed state of the switch for applying a voltage above or below the reference voltage level to the other input of the amplifier.

In one advantageous system, in accordance with the invention, the output of the amplifier may comprise a switching circuit. If the amplifier system of the invention is employed in a level sensing system, the output circuit may be connected to operate a pump, enabling filling of a tank in which the sensor is located.

In a further advantageous embodiment of the invention, the interface comprises a transistor circuit having two input terminals and an output terminal whereby the switch sensor is connected across the two input terminals and the other input of the amplifier is connected to the output terminal of the interface. The interface may comprise a transistor circuit responsive to the state of the switch for controlling the voltage applied to the other amplifier input.

In accordance with a still further embodiment of the invention, a two-way switch may be provided in the interface to enable the alternate use of a thermistor in place of the sensor switch, the thermistor being connected to the same terminals as the sensor switch had been. In this case, the interface is provided with a switch disabling use of the interface. When the sensor is connected in the circuit, voltage dividers at the input of the amplifier apply a voltage to the thermistor such that it is heated when not immersed in the liquid in the tank.

In order that the invention will be more clearly understood, it will now be disclosed in greater detail with reference to the accompanying drawings wherein:

FIG. 1 is a circuit diagram of an amplifier system incorporating a switch sensor, in accordance with the invention; and FIG. 2 shows a modification of a portion of the system of FIG. 1, incorporating a thermistor in place of the switch.

DESCRIPTION OF THE PREFERRED EMBODIMENT

Referring now to the drawings, the amplifier comprises a conventional operational amplifier 10 having a non-inverting input terminal 11 and an inverting input terminal 12. The positive supply terminal of the amplifier is connected via a conductor 13 to a conductor 14 supplied with a positive supply voltage of +19 volts. The negative supply terminal of the amplifier is connected to the collector of a transistor 16 via a conductor 15. The emitter of transistor 16 is connected to a conductor 17 at a common reference potential. The common reference potential is not ground, since the amplifier is to be used also for level sensing in containers for inflammable products, such as petroleum products. The base of transistor 16 is connected via a resistor 18 to one end of a resistor 19, the other end of resistor 19 being connected to input 11 of amplifier 10. The junction between resistors 18 and 19 is connected via a resistor 63 to conductor 17. The inverting input terminal 12 of the amplifier is connected to the movable contact of a variable resistor 20, which together with two fixed resistors 21, 22 forms a voltage divider connected between conductors 14 and 17. The values of variable resistor 20 and fixed resistors 21, 22 are chosen so that the reference voltage supplied to the inverting input terminal is settable within the range of +4.5 volts through +6.8 volts.

The amplifier 10 has an output terminal 23 connected to the base of a transistor 25 via a resistor 24. The emitter of the transistor is connected to the cathode of a diode 26. The anode of this diode is connected to conductor 14. Moreover, the emitter is connected via a resistor 27 to conductor 17. The combination of diode 26 and resistor 27 holds the potential on the emitter of transistor 25 at a level equal to the potential on conductor 14 minus the forward voltage drop, i.e. about 0.7 volts, of diode 26. The collector of transistor 25 is connected to conductor 17 via the winding of a relay 28. The winding of relay 28 is connected in parallel with a diode 29 to minimize the damage due to transients when the current through the winding is interrupted. The relay operates a switch 30 to open and close, respectively, a circuit which includes a DC voltage source 31 having an EMF of 24 volts and a pump 32 for filling of a tank, schematically shown and identified by the reference numeral 23.

In the drawing, three circuit terminals 34, 35, 36 are shown for connecting an interface 37 to the amplifier 10. Terminal 34 is connected directly to conductor 14. Terminal 35 is connected to the junction between resistors 18 and 19. Terminal 36 is connected via a diode 38 and a variable resistor 39 to the base of a transistor 40. The emitter of this transistor is connected via a diode 41 to terminal 34. The collector of transistor 40 is connected via a resistor 42 and an LED 43 to a first fixed contact 44 of a two-way switch 45. A second fixed contact 46 of the switch 45 is connected to terminal 36 and a movable contact 47 of the switch is connected to the terminal 35. The contact 44 is also connected via a resistor 48 to the junction between diode 38 and variable resistor 39 and is further connected via a resistor 49 to the emitter of transistor 40.

Conductors 14 and 17 are supplied with voltage from a transformer 50 via a rectifying bridge 51, storage capacitor 52 and a regulating circuit consisting of an integrated circuit voltage regulator 53, a variable resistor 54 and a fixed resistor 55, connected in accordance with conventional practice.

A level sensor 56 of switch type is shown connected between terminals 34 and 36. The sensor is schematically shown as a float 57 which, via a float arm 59 journalled on a support 58, operates a contact plate 62 to make or break the connection between two contacts 60, 61. As appears from the drawing, low level in the tank results in the bridging of contacts 60, 16 by contact plate 62. However, when during filling a predetermined level has been reached, the contact plate 62 moves away from contacts 60, 61, thereby breaking the connection between the contacts.

In the preferred embodiment of the invention, the following components have been used.

| 10 | μA 741 | 25 | BC 212 | 40 | BC 212 |
|----|--------|----|--------|----|--------|
| 16 | BC 182 | 26 | 1N 4148 | 41 | 1N 4148 |
| 18 | 10 kohm | 27 | 39 kohm | 42 | 220 ohm |
| 19 | 10 kohm | 29 | 1N 4148 | 43 | FLU 110 |
| 20 | 5 kohm | 31 | battery 24 V | 48 | 470 ohm |
| 21 | 27 kohm | 38 | 1N 4148 | 49 | 39 kohm |
| 22 | 10 kohm | 39 | 20 kohm | 63 | 150 ohm |
| 24 | 39 kohm | | | | |

The combination of amplifier, sensor and interface described above, and shown in the drawing, functions in the following manner:

The potential on the inverting input terminal 12 is set to a suitable level, for example +5.5 volts, by means of variable resistor 20. Further, switch 45 is set to position "switch sensor," i.e. the position shown in which contacts 44 and 47 are interconnected. In one of the two extreme positions that can be taken by float 57, the tank is filled with fluid to such a high level that contact plate 62 has moved away from contacts 60, 61 so that the impedance of the sensor appearing between terminals 34 and 36 is infinite. The potential difference between the base and emitter of transistor 40 is therefore negative and reaches such a magnitude that the transistor is driven into saturation. The impedance appearing between terminals 34 and 35, when transistor 40 is saturated, is essentially determined by resistor 42. The impedance is connected in series with the non-inverting input terminal 11 of amplifier 10 and the potential on terminal 11 takes a value of about +7.7 volts. Thereby, the output of amplifier 10 assumes a level approximately equal to the voltage on conductor 14 or about +19 volts. The potential difference between base and emitter of transistor 25 is positive, the transistor 25 is nonconducting and relay 28 is therefore inactivated. When the relay is inactivated, the circuit in which pump 32 is included is broken and the pump is stopped. An indication that the predetermined level has been reached is given by the LED 43 being lit.

In the second of the two extreme positions that float 57 can take, the fluid level is so low that contact plate 62 bridges contacts 60 and 61. Thereby, circuit terminals 34 and 36 will have the same potential, namely +19 volts, whereby transistor 40 becomes non-conducting. The impedance now connected in series with non-inverting input terminal 11 of amplifier 10 is determined by resistor 48 and with the component values chosen, the potential on the input 11 will take a value of about +4.6 volts. Hence, the potential difference between inputs 11 and 12 becomes negative and the output 23 will assume a low value determined by the voltage drop of the emitter-collector path of the conducting transistor 16. As a result, transistor 25 will be driven into its saturated condition, thereby activating the relay 28, which, in turn, connects the pump 32 to the battery 31.

The amplifier disclosed above can also be used together with thermistor sensors, in which case the switch 45 is set in position "thermistor," i.e. the position in which contacts 46 and 47 are interconnected. A thermistor 70 is connected between the terminals 34 and 36 and placed at the desired level in the tank 33. The interface 37 is therefore disconnected and the resistance of the thermistor is connected in series with input 11 of amplifier 10. At high fluid level in tank 33, the thermistor is cooled by the fluid and has a resistance value less than 315 ohms. In this case, the potential on input 11 has a value greater than +6.4 volts, which gives a positive potential difference between input 11 and input 12 resulting in high level on the output 23. As disclosed above, the transistor will be driven into its nonconducting state and the relay will become inactivated.

When the thermistor is not cooled by fluid in the tank 33, it is heated by the current always flowing in the contact consisting of conductor 14, the thermistor, resistor 63, and conductor 17. The thermistor will have a high resistance value in the area between 315 ohms and about 1 kiloohm. The value depends on the surrounding temperature. The potential difference between inputs 11 and 12 becomes negative and amplifier output 23 assumes a low level. As described above, this means that transistor 25 is driven into saturation whereby the relay 28 is activated, closing the supply circuit to pump 32. The pump is activated either directly or in dependence on further conditions.

It may happen that switch 45 is in the position "switch sensor," with contacts 44 and 47 bridged, when a thermistor sensor is connected to circuit terminals 34 and 36. In such a case, relay 28 must not be activated to start the pump 32. This is prevented by the fact that even the low resistance of a thermistor between terminals 34 and 36 can set transistor 40 into its conductive condition resulting in a sufficiently low resistance in the current path from conductor 14 via diode 41, emitter-collector path of transistor 40, resistor 42, diode 43 to upper end of resistor 63, to get a positive potential difference between inputs 11 and 12, and accordingly a high level at output 23. An incorrect connection of a thermistor sensor is indicated by the LED 43 being lit.

By combining an amplifier and an interface according to the invention, it is thus possible to use the amplifier alternatively with thermistor sensors or switch type sensors.

While the invention has been disclosed and described with reference to a single embodiment, it is apparent that variations and modifications may be made therein, and it is intended in the following claims to cover each such variation and modification as falls within the true spirit and scope of the invention.

What is claimed is:

1. An amplifier system having an amplifier, a sensor and an interface between said sensor and amplifier, said amplifier having a reference input terminal and a second input terminal, said interface having an output terminal and comprising means responsive to said sensor for producing a voltage selectively above or below the voltage at said reference input terminal, two-way switch means for selectively connecting said output terminal to said second input terminal of said amplifier, whereby the output of said amplifier has a high or low level depending upon the state of said sensor, and an output circuit connected to the output of said amplifier, said two-way switch means connected to selectively open the connection between said second input terminal and said output terminal and to connect the second input terminal directly to said sensor.

2. The amplifier system of claim 1 wherein said amplifier comprises an operational amplifier, and means applying said reference voltage to the inverting terminal of said amplifier.

3. An amplifier system having an amplifier, a sensor and an interface between said sensor and amplifier, said amplifier having a reference input terminal and a second input terminal, said interface comprising means responsive to said sensor for applying a voltage selectively above or below the voltage at said reference input terminal to said second input terminal, whereby the output of said amplifier has a high or low level depending upon the state of said sensor, and an output circuit connected to the output of said amplifier, said interface further comprising two-way switch means connected to disable said interface, said interface comprising two input terminals, said sensor being connected between said two input terminals, said interface further comprising a transistor, means connecting the base of said transistor to one input terminal of said interface, first and second operating voltage supply terminals, means connecting the emitter of said transistor to the other input terminal of said interface, first impedance means connecting the collector of said transistor to said output terminal via said switch means, and second impedance means connecting said one input terminal to said output terminal via said switch means.

4. The amplifier system of claim 3 wherein said other input terminal of said interface is connected to said second operating voltage supply terminal, and further comprising light emitting diode connected in series with said collector.

5. The amplifier system of claim 4 comprising means for connecting said first impedance means of said interface to said second input terminal of said amplifier, said two-way switch means being connected to open said last mentioned interconnection and to connect said second input of said amplifier to said one input terminal of said interface.

6. The amplifier system of claim 5 wherein said sensor comprises a switch.

7. The amplifier system of claim 5 wherein said sensor comprises a thermistor.

8. The amplifier system of claim 5 wherein said amplifier comprises an operational amplifier.

9. The amplifier system of claim 5 for use in a fluid level detecting system for maintaining a fluid level in a tank, wherein said output circuit comprises switch control means, and pump means connected to said switch control means for enabling filling of said tank.

10. The amplifier system of claim 9 wherein said sensor comprises either a thermistor or switch mounted in said tank.

11. The amplifier system of claim 1 wherein said two-way switch means is a single pole double throw switch, further comprising a source of operating voltage for said interface connected to said output terminal, whereby the same contacts of said two-way switch means remove operating supply current from said interface and remove said voltage produced in said interface from said output terminal, when said sensor is connected directly to said output terminal.

12. An amplifier system for selective use with switch type and resistive type sensors, and comprising an amplifier, and an interface connected to the input of said amplifier for adapting the input of said amplifier for different types of sensors, said interface comprising an input terminal adapted to be connected to a sensor, amplifier means and an amplifier means bypass each connected to said input terminal, and two-way switch means connected to selectively interconnect said amplifier means and said amplifier means bypass to said amplifier, said amplifier means comprising means for converting output level thereof to simulate a resistive type sensor when a switch type sensor is connected to said input terminal, said switch means further being connected to disable said amplifier means when said amplifier means bypass is connected to said amplifier.

13. The amplifier system of claim 12 comprising a source of operating voltage, said amplifier means including an amplifier, wherein said two-way switch means is a single pole double throw switch connected to apply operating voltage to the amplifier of said interface when said switch is connected to said amplifier means, whereby said amplifier means is inoperative when said switch is connected to said amplifier means bypass.

14. An amplifier system for selective use with switch type and resistive type sensors comprising an operational amplifier, a source of operating potential connected to said amplifier and having two source terminals of different potential, means applying a reference potential intermediate said different potentials to the inverting input terminal of said operational amplifier, a pair of sensor input terminals adapted to be connected to a sensor, one of the sensor input terminals being connected to one of the source terminals, a resistor connected between the other source terminal and the non-inverting terminal of said operational amplifier, a direct current amplifier having an input connected to the other sensor input terminal, a two pole double throw switch having a first position connecting said non-inverting terminal substantially directly to said other sensor input terminal, and a second position connecting said non-inverting input terminal to said direct current amplifier whereby said resistor comprises a load resistor for said direct current amplifier, said direct current amplifier having a resistive current path from the output thereof to said other sensor input terminal.

15. The amplifier system of claim 14 wherein said direct current amplifier comprises a transistor, first resistive means coupling the collector of said transistor to said switch means, diode means coupling the emitter of said transistor to said one source terminal, and diode means coupling said other sensor input terminal to the base of said transistor, said resistive current path comprising resistance means coupling said last mentioned diode to said two-way switch.

16. The amplifier system of claim 15 further comprising a light emitting device connected in series with the collector-emitter path of said transistor.

* * * * *